(12) United States Patent
Horn et al.

(10) Patent No.: US 8,114,001 B2
(45) Date of Patent: Feb. 14, 2012

(54) WORKPIECE PROCESSING PLANT

(75) Inventors: Wolfgang Horn, Goppingen (DE);
Moshe Israel Meidar, New York, NY (US); Thomas Bayha, Markgroningen (DE); Ralf Haug, Deggingen (DE)

(73) Assignee: MAG IAS, LLC, Sterling Heights, MI (US)

( * ) Notice: Subject to any disclaimer, the term of this patent is extended or adjusted under 35 U.S.C. 154(b) by 660 days.

(21) Appl. No.: 12/306,195

(22) PCT Filed: Jun. 11, 2008

(86) PCT No.: PCT/EP2008/004636
§ 371 (c)(1),
(2), (4) Date: Dec. 22, 2008

(87) PCT Pub. No.: WO2009/000410
PCT Pub. Date: Dec. 31, 2008

(65) Prior Publication Data
US 2009/0288287 A1    Nov. 26, 2009

(30) Foreign Application Priority Data
Jun. 22, 2007    (DE) .................. 10 2007 029 233

(51) Int. Cl.
*B23Q 3/155*    (2006.01)
*B23Q 7/14*    (2006.01)
*B23Q 41/02*    (2006.01)

(52) U.S. Cl. .............. 483/15; 483/16; 483/901; 29/563; 409/137; 409/158; 409/159; 414/222.13

(58) Field of Classification Search ............ 29/563, 29/33 P; 414/222.01, 222.07, 222.13, 225.01, 414/226.05; 198/345.3, 346.1; 483/15, 16, 483/901; 409/158–159, 172, 137
See application file for complete search history.

(56) References Cited

U.S. PATENT DOCUMENTS

| 4,711,016 A | 12/1987 | Genschow et al. |
| 5,321,874 A * | 6/1994 | Mills et al. .................... 29/33 P |
| 5,407,415 A * | 4/1995 | Spishak ......................... 29/563 |
| 6,315,106 B1 | 11/2001 | Hirano et al. |
| 6,826,821 B2 * | 12/2004 | Geiger et al. .................. 29/563 |
| 7,101,137 B2 * | 9/2006 | Schwarz et al. ......... 414/222.01 |
| 7,493,687 B2 * | 2/2009 | Hessbruggen ................. 29/563 |
| 2006/0179639 A1 | 8/2006 | Nussbaum et al. |

(Continued)

FOREIGN PATENT DOCUMENTS

DE    2420240 A1    1/1975

(Continued)

OTHER PUBLICATIONS

Machine Translation of EP 1430990, which EP '990 was published Jun. 2004.*

(Continued)

*Primary Examiner* — Erica E Cadugan
(74) *Attorney, Agent, or Firm* — Reising Ethington P.C.

(57) ABSTRACT

A workpiece processing plant comprises several machine tools which are arranged in opposite rows. The rows define a free space between each other. A loading and unloading device is provided which comprises a girder above the machine tools and above the free space. Rails are provided on the upper side of the girder. A loading and unloading unit configured as a multiple-axis robot is displaceable along the rails, the loading and unloading unit comprising several arms which are articulated to one another.

8 Claims, 4 Drawing Sheets

U.S. PATENT DOCUMENTS

2006/0230596 A1 * 10/2006 Stengele et al. ............... 29/563

FOREIGN PATENT DOCUMENTS

| DE | 4127446 A1 | 2/1993 |
| DE | 19756278 | 7/1999 |
| DE | 102005009283 | 8/2006 |
| EP | 0110815 | 11/1983 |
| EP | 0992319 A2 | 4/2000 |
| EP | 1430990 | 6/2004 |
| EP | 1479476 A1 | 11/2004 |
| EP | 1693145 A1 | 8/2006 |
| GB | 1437596 | 5/1976 |
| JP | 8174449 | 7/1996 |
| WO | 2006089625 | 8/2006 |
| WO | WO 2006/089625 A1 * | 8/2006 |

OTHER PUBLICATIONS

International Search Report for PCT/EP2008/004636 dated Sep. 25, 2008.

* cited by examiner

WORKPIECE PROCESSING PLANT

BACKGROUND OF THE INVENTION

1. Field of the Invention

The invention relates to a workpiece processing plant comprising several machine tools.

2. Background Art

A workpiece processing plant is known from WO 2006/089625 A1, the workpiece processing plant comprising several machine tools which are arranged in two opposite rows. A loading and unloading unit is arranged for displacement along rails on the floor between the two rows of machine tools, the loading and unloading unit comprising two arms which are articulated to each other and comprise a workpiece gripper. This known plant is space-consuming and not accessible. A similar plant is also known from US 2006/0230596 A1.

A workpiece processing plant is known from US 2006/0179639 A1, the workpiece processing plant being provided with a vertically displaceable lifting slide comprising a workpiece gripper by means of which a workpiece is movable into or out of a loading and unloading position of the machine tool from above via a hatch that is disposed in a roof area of a housing which encloses the respective machine tool. This plant is not flexible. A similar portal robot is known from DE 41 27 446 A1.

SUMMARY OF THE INVENTION

It is the object of the invention to design a workpiece processing plant comprising several machine tools, which are arranged in two opposite rows, in such a way as to make optimal use of the available space.

This object is attained by a workpiece processing plant comprising
- several machine tools
  - which are arranged in two opposite rows;
  - wherein the rows define a free space; and
  - which comprise in each case a loading and unloading position next to the free space;
- a loading and unloading device
  - which comprises a girder above the machine tools and above the free space;
  - which comprises rails which are arranged on an upper side of the girder;
  - which comprises a loading and unloading unit which is configured as a multiple-axis robot that is displaceable along the rails; and
  - wherein the loading and unloading unit comprises several arms which are articulated to one another.

As the loading and unloading device is arranged centrally above the free space, in other words above and in the middle between the two rows of machine tools, the gripper device, which consists of several arms that are articulated to each other, can be moved to the loading and unloading position of the respective machine tool from above in order to insert or remove a workpiece; alternatively, the machine can also be cleaned from within the housing by means of a cleaning head.

Further advantages, features and details of the invention will become apparent from the ensuing description of two embodiments, taken in conjunction with the drawing.

DESCRIPTION OF THE PREFERRED EMBODIMENT

Figure 1:
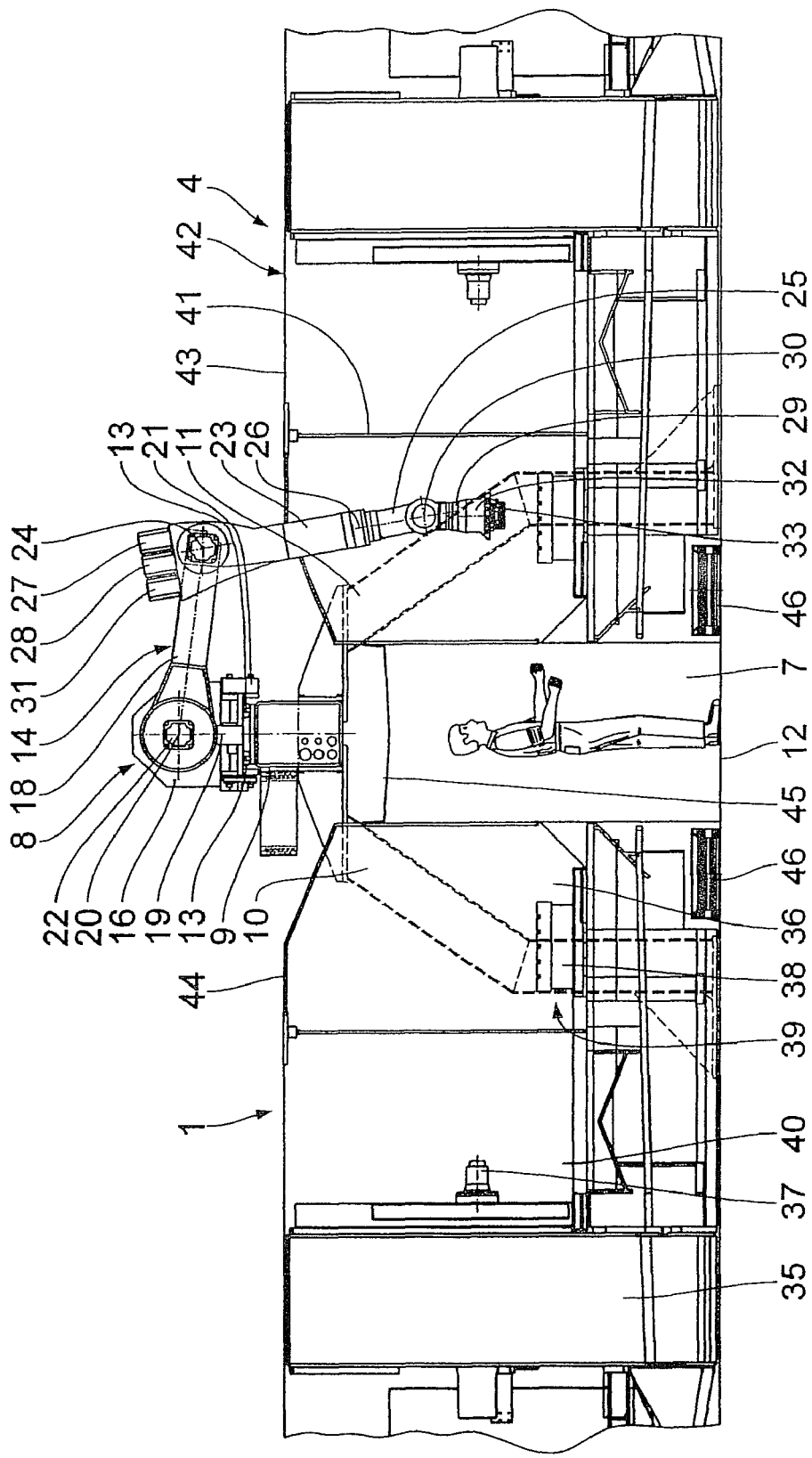
FIG. 1 is a side view of a workpiece processing plant comprising a workpiece gripper.
Figure 2:
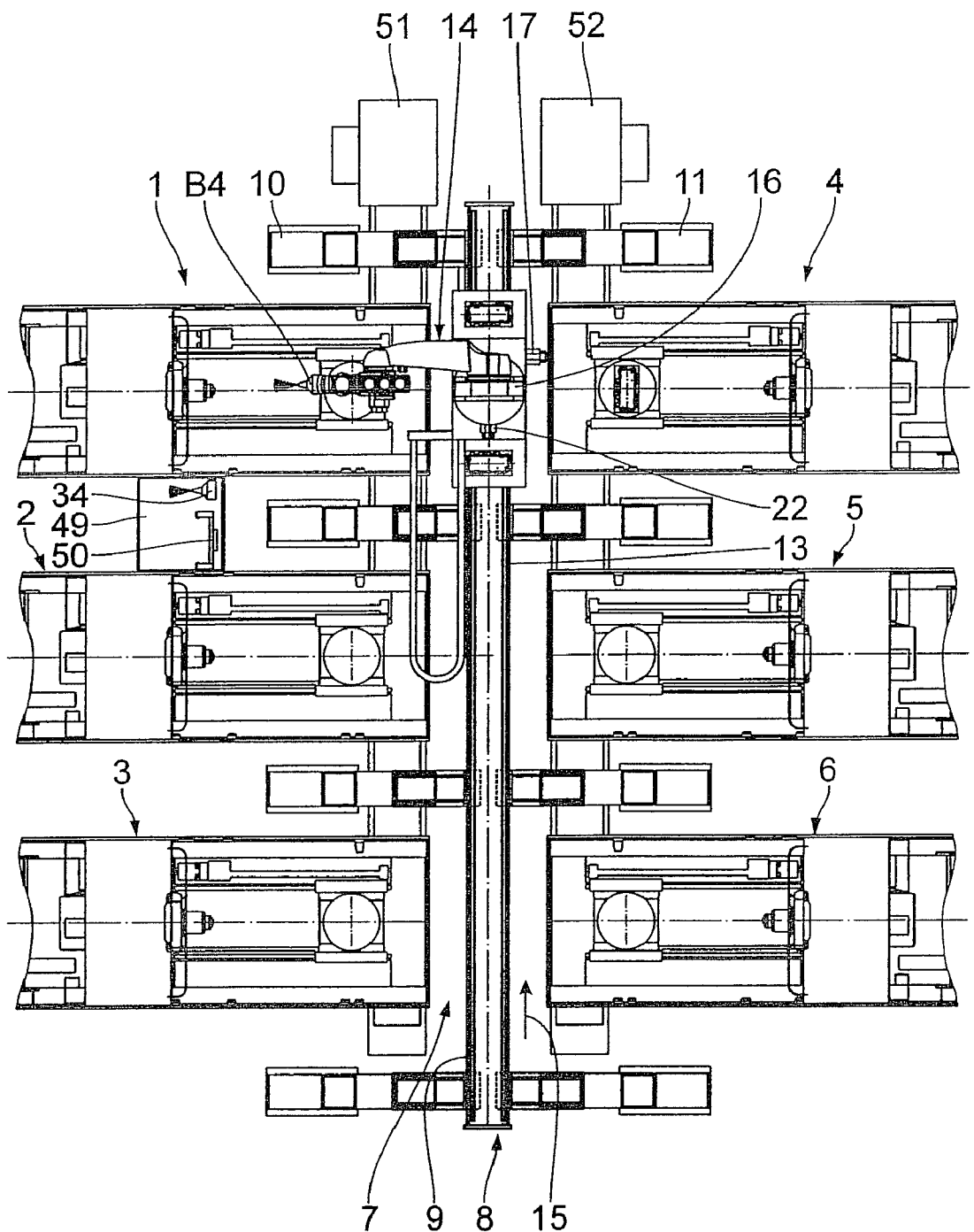
FIG. 2 is a plan view of the workpiece processing plant according to FIGS. 1 and 3.
Figure 3:
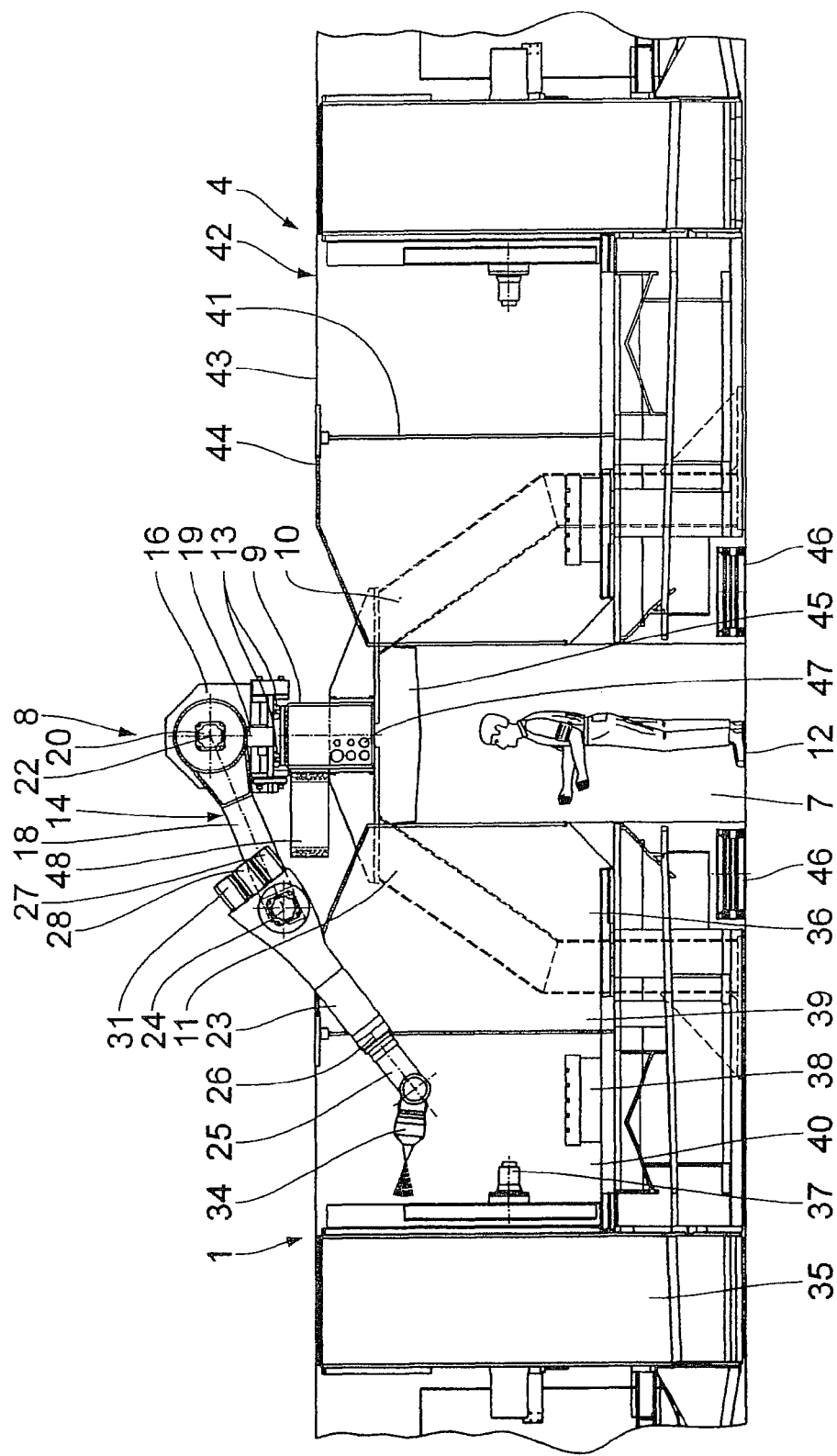
FIG. 3 is an illustration, similar to FIG. 1, comprising a cleaning head.

The workpiece processing plant shown in FIGS. 1 to 3 comprises a total of six machine tools 1, 2, 3, 4, 5, 6 which are arranged in two rows of three machines each. The machine tools 1, 2, 3 on the one hand and 4, 5, 6 on the other face each other in such a way that there is a free space 7 between them which serves as a passageway for an operator in the present case. In the middle above this free space 7 is arranged a loading and unloading device 8 which comprises an upper girder 9 having a box shape. This girder 9 is supported on the floor 12 via props 10, 11.

The upper side of the girder 9 is provided with rails 13 on which a loading and unloading unit 14 configured as a 6-axis robot is arranged for displacement in a displacement direction 15. The device 14 comprises a slide 16 which is guided along the rails 13 for displacement in direction 15 and which is drivable by means of a displacement motor 17. A first pivot arm 18 is mounted in such a way as to be movable about a vertical axis of rotation 19 and a horizontal first pivot axis 20. Rotation about the vertical axis of rotation 19 takes place by means of a rotation motor 21 while the pivoting movement about the first horizontal pivot axis 20 is performed by means of a first pivot motor 22.

A second pivot arm 23 is articulated to the end of the first pivot arm 18 remote from the slide 16 in such a way as to be pivotable about a second horizontal pivot axis. Remote from the second pivot axis 24, a rotating arm 25 is arranged on the second pivot arm 23, the rotating arm 25 being rotatable about a longitudinal axis 26 extending in the longitudinal direction of the second pivot arm 23. The pivoting movement about the second pivot axis 24 is performed by means of a second pivot motor 27. Rotation about the longitudinal axis 26 is performed by means of a longitudinal rotation motor 28. Finally, a gripper arm 29 is articulated to the rotating arm 25 for pivoting movement about a third pivot axis 30, the gripper arm 29 being drivable by a third pivot motor 31. For instance, the gripper arm 29 may optionally be provided with a gripper 32 for a workpiece 33 or a cleaning head 34 for cleaning a machine tool 1 to 6 which may be attached in an interchangeable manner.

Each of the machine tools 1 to 6 shown in the drawing has a stand 35 which is provided with a tool spindle 37 that projects into a working chamber 36 and is vertically and horizontally displaceable in the usual manner. In the working chamber 36, a workpiece slide 38 is arranged for displacement in the longitudinal direction of the tool spindle 37. The workpiece slide 38 is displaceable between a loading and unloading position 39 next to the free space 7 and a processing position 40 in front of the tool spindle 37 and vice versa. Between position 39 and position 40 is provided an intermediate wall 41 which is movable away therefrom. The machine tool may be designed as desired. For instance, instead of a linearly displaceable workpiece slide 38, there may be provided a rotating table which carries in each case two workpieces in such a way that one workpiece is being processed while a processed workpiece may at the same time be removed and replaced by a workpiece to be processed. Such designs of machine tools are generally known as well.

The machine tools 1 to 6 are in each case surrounded by a housing 42 which encloses the machine tools 1 to 6 in a substantially tight manner. Next to the free space 7, a hatch 44 is provided in each roof area 43 which allows the second pivot arm 23, together with the gripper arm 29 and a workpiece 33, to be inserted into the housing 42; alternatively, a cleaning head 34 may be inserted for cleaning.

In the upper region of the free space 7 below the girder 9 is arranged a drip pan 45 which spans the free space 7. In the embodiment according to FIGS. 1 to 3, a chip conveyor 46 is in each case arranged below the machine tools 1, 2, 3 and 4, 5, 6 which are arranged in a row; in other words, the chip conveyor 46 moves in each case directly next to the free space 7 along displacement direction 15.

In the girder 9, which has the shape of a relatively large box, are arranged a plurality of lines 47 through which are conveyed free-flowing media, such as compressed air or compressed oil, which are supplied to the individual machines 1 to 6. A cable harness 48 is arranged on the side of the slide 16 of the loading and unloading unit 14 for the supply of energy to the motors 17, 21, 22, 27, 28, 31.

Furthermore, a docking station 49 is provided between two machine tools 2, 3 on which are for instance provided a cleaning head 34 and a workpiece gripper 50 which are optionally attachable to the gripper arm 29 of the loading and unloading unit 14.

The loading and unloading unit 14 allows workpieces 33 to be placed on a workpiece slide 38 for processing by means of the associated machine tool 1 to 6 and to be removed therefrom after processing. For further processing, the workpieces 33 can be transported from machine tool to machine tool. Naturally, a parallel processing instead of a serial processing is possible as well. Transport may take place in the sequence of the machine tools 1 to 3 and 4 to 6 which are arranged in succession. Transport may however also take place from one machine tool 1 to 3 to an opposite machine tool 4 to 6. The workpieces 33 to be processed are fed in via a workpiece feeder 51; after processing, they are discharged again via a workpiece discharge device 52.

The free space 7 between the opposite machine tools 1 to 3 and 4 to 6 is completely free and is easily accessible by an operator.

Figure 4:
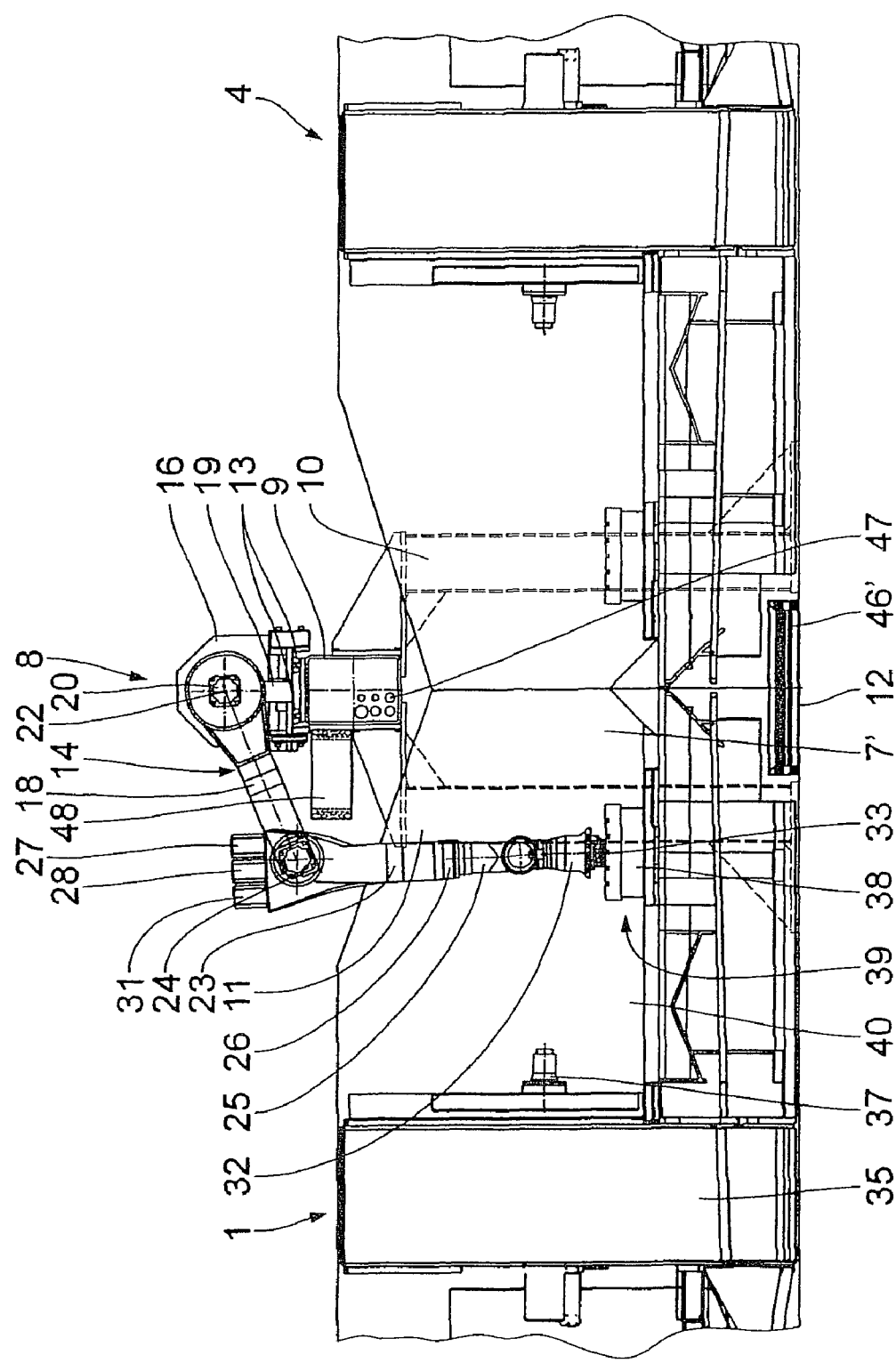
FIG. 4 is a side view of an embodiment which is modified compared to FIGS. 1-3.

In the embodiment according to FIG. 4 on the other hand, the opposite machine tools 1 to 3 on the one hand and 4 to 6 on the other are closer to one another, with the result that the free space 7' between them is much narrower. In this case, there is only one central chip conveyor 46' in the lower region of the free space 7' instead of two chip conveyors 46 below each row of machine tools 1 to 3 and 4 to 6. Likewise, the loading and unloading device 8 of this embodiment requires no space in front of the machine tools 1 to 6 or between the two rows of machine tools 1 to 3 and 4 to 6 either.

What is claimed is:

1. A workpiece processing plant comprising
   two opposite rows, each including a plurality of machine tools;
   wherein the rows define a free space; and
   which machine tools comprise in each case a loading and unloading position next to the free space;
   a loading and unloading device
   which comprises a girder above the machine tools and above the free space;
   which comprises rails which are arranged on an upper side of the girder;
   which comprises a loading and unloading unit which is configured as a multiple-axis robot that is displaceable along the rails; and
   wherein the loading and unloading unit comprises plural arms which are articulated to one another.

2. A workpiece processing plant according to claim 1,
   wherein the free space is configured as a passageway for an operator;
   wherein a chip conveyor is assigned to each row, respectively, of machine tools; and
   wherein in the upper region of the free space but below the girder is arranged a drip pan which spans the free space.

3. A workpiece processing plant according to claim 1, wherein a central chip conveyor for the two rows of machine tools is arranged in the free space.

4. A workpiece processing plant according to claim 1,
   wherein the machine tools are in each case enclosed by means of a respective housing which comprises a hatch for at least two of the arms in a roof area next to the girder.

5. A workpiece processing plant according to claim 1,
   wherein the loading and unloading unit comprises a slide which is displaceable along the rails in a displacement direction, wherein the arms, which are articulated to one another, are attached to the slide in such a way as to be movable about a vertical axis of rotation and a horizontal first pivot axis.

6. A workpiece processing plant according to claim 5,
   wherein the arms, which are articulated to one another, comprise a first pivot arm which is movably attached to the slide, a second pivot arm which is articulated to the first pivot arm, a rotating arm which is disposed on the second pivot arm and a gripper arm.

7. A workpiece processing plant according to claim 6,
   wherein one of the group comprising a gripper and a cleaning head is attachable to the gripper arm in an interchangeable manner.

8. A workpiece processing plant according to claim 7, wherein a docking station is provided for docking one of the group comprising a gripper and a cleaning head.

* * * * *